United States Patent [19]

Petersen

[11] 4,385,591

[45] May 31, 1983

[54] HOG FEEDER

[76] Inventor: Chris C. Petersen, 1523 1st Ave. S., Denison, Iowa 51442

[21] Appl. No.: 257,348

[22] Filed: Apr. 24, 1981

[51] Int. Cl.³ .............................................. A01K 5/00
[52] U.S. Cl. ..................................... 119/53.5; 119/54
[58] Field of Search ................. 119/54, 53.5, 53, 52 R

[56] References Cited

U.S. PATENT DOCUMENTS

| | | | |
|---|---|---|---|
| 1,301,383 | 4/1919 | Burrell | 119/54 |
| 1,822,289 | 9/1931 | Helmers | 119/53 |
| 2,371,617 | 3/1945 | Halverson | 119/52 R |
| 2,522,635 | 9/1950 | Pittenger et al. | 119/54 |
| 2,640,464 | 6/1953 | Jindrich | 119/54 |
| 2,808,029 | 10/1957 | Geerlings | 119/53.5 |
| 4,246,678 | 1/1981 | Cunningham | 119/54 |
| 4,278,049 | 7/1981 | Van Dusseldorp | 119/53.5 |
| 4,312,298 | 1/1982 | Swearingin | 119/54 |

*Primary Examiner*—Hugh R. Chamblee
*Attorney, Agent, or Firm*—Zarley, McKee, Thomte, Voorhees & Sease

[57] ABSTRACT

A hog feeding device comprising at least a lower unit having a bottom portion with opposite end walls and spaced apart side walls extending upwardly therefrom to define a central feed storage area therebetween. A plurality of horizontally spaced apart feed bowls are provided at the lower ends of the side walls which are in communication with the central feed storage area. A feed flow adjustment assembly is mounted within the feed storage area to control the amount of feed passing from the central feed storage area to the feed bowls. An agitator assembly is also mounted in the feed storage area which is activated by the hogs, during feeding, to prevent the feed from clogging or plugging in the feed storage area. The lower unit is of monolithic concrete construction.

10 Claims, 3 Drawing Figures

FIG. I

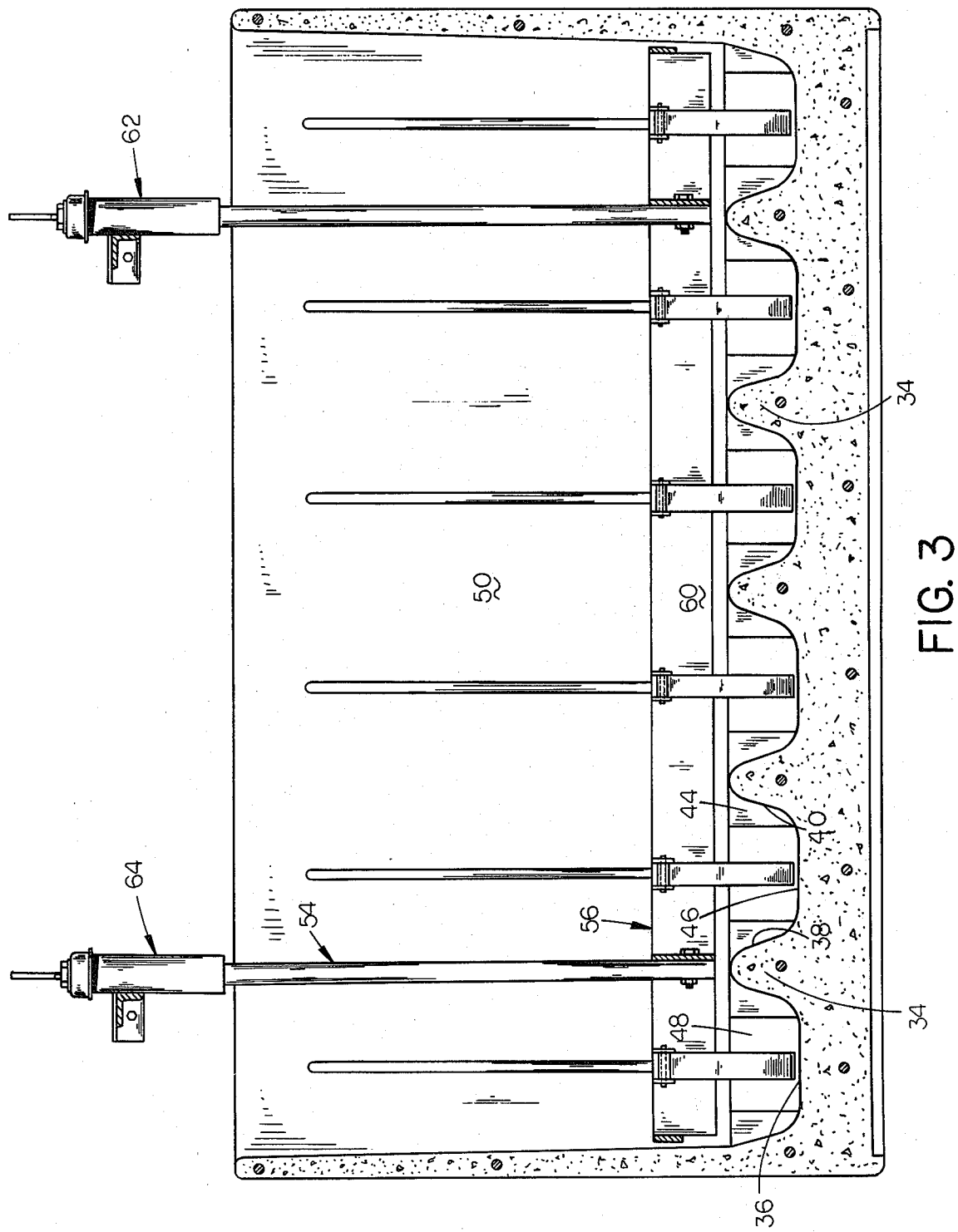

HOG FEEDER

BACKGROUND OF THE INVENTION

Hog feeders and hog feeding devices have been in existence for many years. The first hog feeding devices were constructed of wood and generally included a centrally disposed hopper which was in communication with a feeding area located therebelow. The biggest problem associated with the wooden hog feeding devices was that they would rot when exposed to the elements and that the hogs would chew upon the feeder thereby severely damaging the unit.

In an effort to overcome the objections to wooden feeders, one manufacturer has devised a concrete feeder wherein a plurality of concrete sections are bolted together to form at least the lower portion of the feeder. Although such a feeder did represent a significant improvement over the wooden feeders, the feeder does suffer from some serious disadvantages. One problem associated with the concrete feeder comprised of a plurality of component parts is that the feeder does leak at the joints of the concrete components. An additional disadvantage of devices of this type is that the feed tends to become lodged in the corners of the feed bowls. A still further problem associated with the concrete feeders of the prior art is that the feed in the hopper tends to plug or clog which results in the feed being unable to drop downwardly into the feed bowls. A still further disadvantage of the prior art devices is that they are not easily removable from one location to another.

Therefore, it is a principal object of the invention to provide an improved hog feeding device.

A further object of the invention is to provide a hog feeder wherein the lower unit is of monolithic concrete construction.

A still further object of the invention is to provide a hog feeder including means to prevent the plugging or clogging of feed therein.

A still further object of the invention is to provide a hog feeding device including means for preventing moisture from entering the lower end of the hopper.

A still further object of the invention is to provide a hog feeding device which may be easily removed from one location to another.

A still further object of the invention is to provide a hog feeding device including means for varying the rate of flow from the hopper to the feed bowl.

A still further object of the invention is to provide a hog feeding device which is durable in use and refined in appearance.

These and other objects will be apparent to those skilled in the art.

BRIEF DESCRIPTION OF THE DRAWINGS

FIG. 3 is a sectional view seen on lines 3—3 of FIG. 1.

SUMMARY OF THE INVENTION

Figure 1:
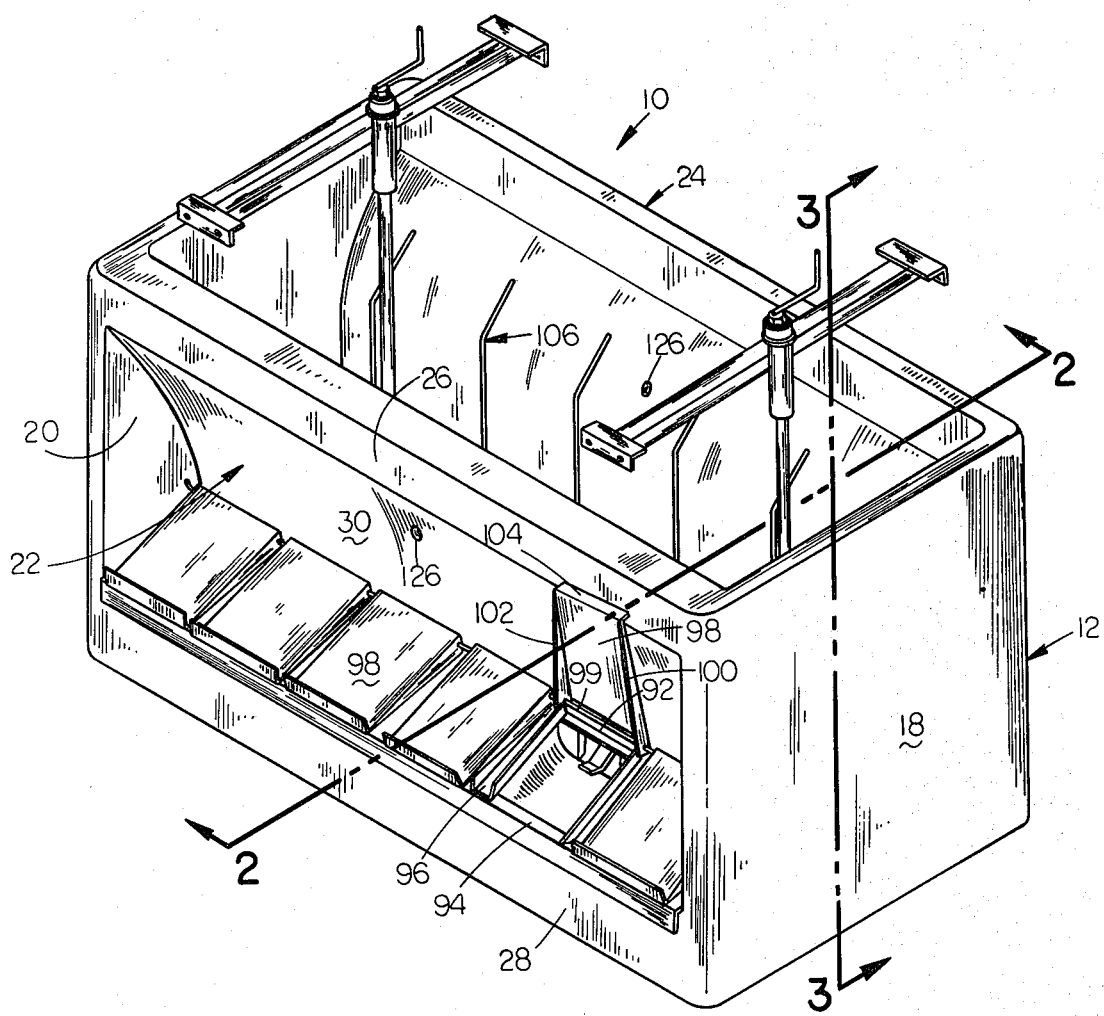
FIG. 1 is a perspective view of the lower portion of the hog feeding device.

A hog feeding device is described including a lower unit and an extension which extends upwardly therefrom to provide increased storage capacity. The lower unit is of monolithic concrete construction and includes a plurality of arcuate feed bowls at the lower opposite sides thereof which communicate with the feed storage area so that feed is supplied thereto. A vertically movable adjustment means is provided in the hopper to vary the amount of feed being supplied to the feed bowls. A plurality of agitators are movably mounted on the adjustment means and extend downwardly into the feed bowls whereby the hogs will move the agitators as they eat so that the feed in the storage area will not become clogged or plugged.

DESCRIPTION OF THE PREFERRED EMBODIMENT

The hog feeder of this invention is generally referred to by the reference numeral 10 and generally includes a lower unit 12 and an upper unit 14 which serves as an extension to increase the feed storage capacity of the unit. The apparatus will function without the upper unit but it is preferred that the upper unit be utilized for the increased storage capacity which it provides.

Lower unit 12 is of monolithic concrete construction reinforced with rods or bars 16 extending throughout. The bars in the sides and ends of the lower unit 12 are tied together in customary fashion to achieve the desired strength for the unit.

Lower unit 12 generally includes ends 18 and 20 having side walls 22 and 24 extending therebetween. Inasmuch as the side walls 22 and 24 are identical, only side wall 22 will be described in detail. Side wall 22 includes an upper side wall portion 26 and a lower side wall portion 28 having exterior surfaces which generally dwell in the same vertical plane. Intermediate wall portion 30 extends downwardly and inwardly from the lower end of upper side wall portion 26.

Figure 2:
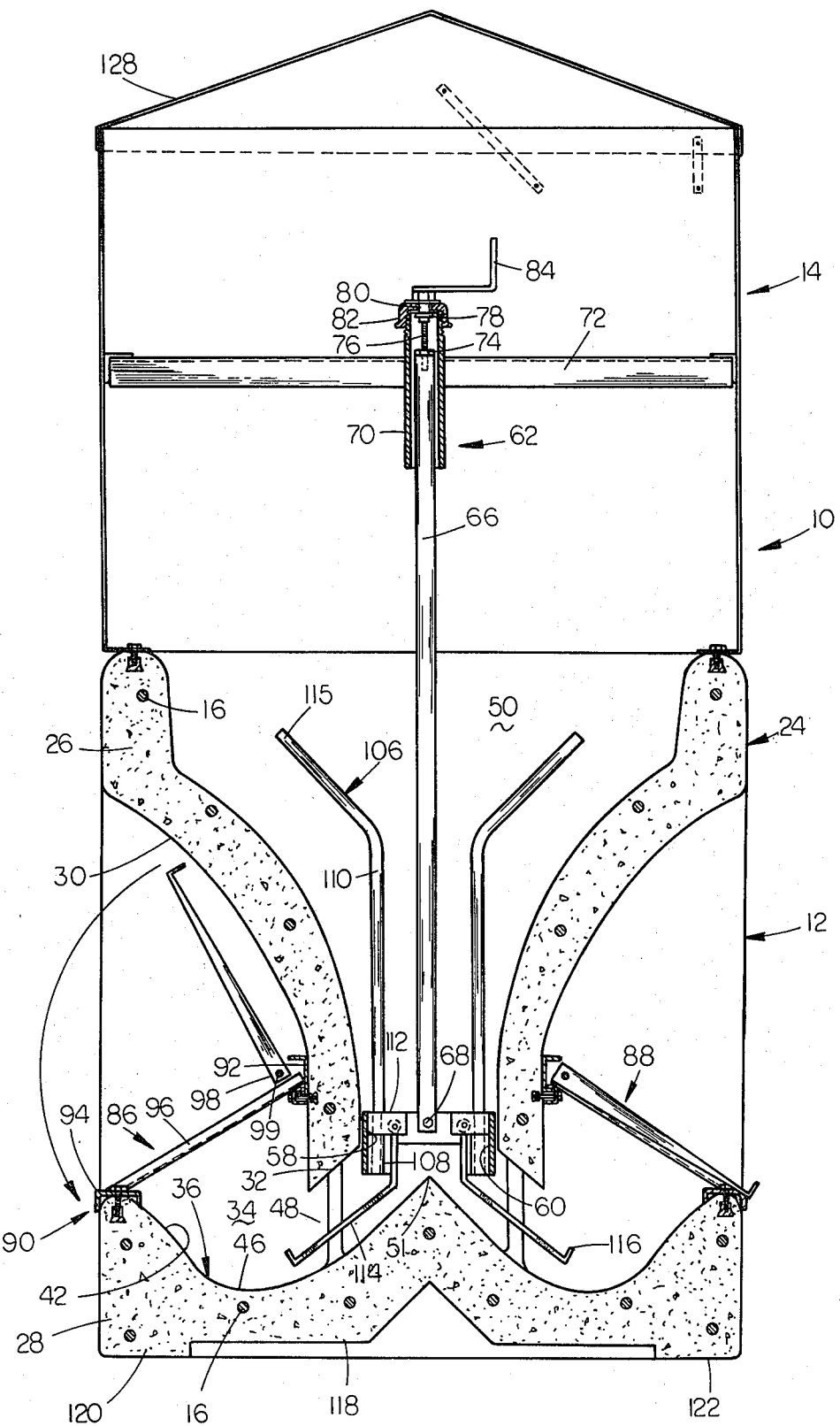
FIG. 2 is a sectional view of the hog feeding device as seen on lines 2—2 of FIG. 1.

A plurality of spaced-apart bowl divider walls 34 extend inwardly from lower end portion 28 to the lower end of intermediate wall portion 30 to define a plurality of feed bowls 36. For purposes of description, each of the feed bowls 36 will be described as having side walls 38 and 40, outer wall 42, inner wall 44 and bottom 46. It should be noted that the juncture of the side walls with the inner and outer walls as well as the juncture of the walls with the bottom are curved to eliminate any corners or crevices in which feed can be trapped. The inner wall 44 in each of the feed bowls 36 is provided with an opening 48 which provides communication between the feed storage area 50 and the feed bowl. As seen in FIG. 2, the lower unit 12 is provided with an inverted V-shaped portion 51 which is centrally positioned between the side walls 22 and 24 to cause the feed to flow downwardly into the feed bowls at each side of the unit. The fact that the upper end of the inverted V-shaped portion 51 is disposed above the bottom of the feed bowls prevents water or the like from moving upwardly from the feed bowls into the interior of the feed storage area 50. It should also be noted that the lowermost portion of the bottom of the feed bowl 36 is located outwardly of the lower outer portion of intermediate wall portion 30 to prevent moisture from moving upwardly into the feed storage area 50.

The numeral 54 refers generally to a feed flow regulator apparatus which is positioned within the feed storage area 50. Apparatus 54 generally includes a rectangular frame means 56 having vertically disposed sides 58 and 60 which are positioned adjacent the inner surfaces of the lower ends of the intermediate wall portions 30 as best seen in FIG. 2. A pair of adjusters 62 and 64 are operatively secured to the frame means 56 for raising and lowering the frame means 56 to vary the position of the sides 58 and 60 relative to the openings 48 to control the rate of flow from the area 50 to the feed bowls. Inasmuch as the adjusters 62 and 64 are identical, only adjuster 62 will be described in detail. Adjuster 62 includes a pipe 66 which has its lower end secured to the rectangular frame means 56 by bolt 68. The upper end of pipe 66 is freely received by a larger pipe 70 which is secured to the support 72 which extends between the walls of the upper unit 14 as illustrated in the drawings. A nut 74 is welded to the upper end of pipe 66 and threadably receives bolt 76 therein. Collar 78 is welded to the upper end of bolt 76 and has a reduced diameter portion 80 extending through an opening formed in threaded cap 82 which is threadably mounted on the upper end of pipe 70. Handle 84 is welded to the upper end of reduced diameter portion 80 as illustrated in the drawings. Thus, rotation of handle 84 causes bolt 76 to be rotated relative to the nut 74 and pipe 66 so that pipe 66 will be raised or lowered relative to the pipe 70. Vertical movement of the pipe 66 relative to pipe 70 causes the frame means 56 to be vertically moved which changes the relationship of the sides 58 and 60 to the feed flow openings to vary the rate of flow from storage area 50 to the feed bowls 36.

Bowl cover assemblies 86 and 88 are positioned at the opposite sides of the hog feeder 10 as illustrated in the drawings. Inasmuch as assemblies 86 and 88 are identical, only assembly 86 will be described. Assembly 86 includes a frame means 90 including upper and lower frame members 92 and 94 respectively. A plurality of intermediate frame members or channels 96 are secured to the frame members 92 and 94 and extend therebetween as illustrated in the drawings. As seen in the drawings, lower frame member 94 is positioned at and secured to the upper end of the lower side wall portion 28. As also seen in the drawings, the upper frame member 92 is secured to the exterior surface of the intermediate wall portion 30. The channels 96 are positioned over the upper ends of the bowl divider walls 34. A plurality of covers 98 are pivotally secured to frame means 90 by rod 99 and extend over the individual bowls 36 as seen in the drawings. As best illustrated in FIG. 1, each of the covers 98 has downwardly extending side flanges 100 and 102 which are received by the channels 96 to prevent rain or the like from entering the feed bowl area. The lower ends of the covers 98 have a protruding portion 104 which permits the hog to engage the underside thereof to raise the cover from the closed position to the open position.

A plurality of spaced-apart agitator assemblies 106 are mounted on the frame means 56 as described hereinafter. A plurality of collars 108 are welded to the interior surfaces of the walls 58 and 60 and rotatably receive the lower ends of rods 110. Each of the rods 110 have a U-shaped bracket 112 secured thereto which has the upper end of a bar 114 pivotally secured thereto about a horizontal axis. Each of the rods 110 has an upper end portion 115 which extends at an angle from the longitudinal axis of the bar as best illustrated in FIG. 2. The bar 114 is shaped as illustrated in FIG. 2 so that it extends downwardly from the bracket 112 through the opening 48 and into the feed bowl 36. The lower end of the bar 114 has an upwardly protruding portion 116 which is engaged by the hog as the hog feeds. Engagement of the hog with the protruding portion 116 causes the bar 114 to be laterally moved and also pivotally moved upwardly and downwardly with respect to the U-shaped bracket 112 to aid in preventing the clogging or plugging of feed in the opening 48. Lateral movement of the bar 114 by the hog during feeding also causes the rod 110 to rotate about a vertical axis relative to the collar 108 thereby causing the upper end portion 115 of the rod 110 to agitate the feed to insure the free flow of the feed within the storage area 50.

It should be noted that the lower central portion of the bottom of lower unit 12 is cut away at 118 so that the lower ends of side wall portions 28 form skids 120 and 122 to enable the unit to be easily removed from one location to another. The lower corners of the walls 18 and 20 are also rounded off to enable the skids 120 and 122 to be easily pulled or moved through dirt or the like. Preferably, intermediate side wall portion 30 of each of the side walls is provided with an opening 126 formed therein to enable a cable, chain or the like to be operatively extended therethrough by means of a bolt or the like so that the unit may be pulled from one location to another.

The unique design of the feeder is thought to be a significant advance in the art. The feed may be placed through the removable cover 128 on the upper unit 14 if the unit is used in an area exposed to the elements. If the unit is used inside an enclosure, the cover 128 is not needed. The feed is placed in the interior of the unit by any conventional conveying means. The feed in the unit will flow downwardly through the storage area 50 through the openings 48 and into the feed bowls 36. The curved shaped of the feed bowls 36 eliminates cracks and crevices in which feed would otherwise be trapped.

As previously stated, the rate of flow of feed from the feed storage area 50 into the feed bowls 36 may be easily varied by means of the feed flow regulator apparatus 54. Vertical movement of the frame means 56 by the adjusters 62 and 64 changes the relationship of sides 58 and 60 to the openings 48. As also previously stated, the agitator assemblies 106 prevent the feed from becoming clogged to insure an even flow of feed from the area 50 to the feed bowls 36.

It should also be noted that the design of the upper end of the adjuster assemblies is quite important in that feed is prevented from entering the interior of the assembly which would quickly foul the internal working components thereof.

Thus it can be seen that a novel conrete hog feeder has been provided which is of monolithic conrete construction to prevent moisture or the like from entering the interior of the feed storage area and which is extremely durable in use. Thus, the apparatus accomplishes at least all of its stated objectives.

I claim:

1. A hog feeder comprising,
at least a lower unit including a bottom portion, opposite end walls, spaced-apart side wall members extending between said end walls, and an open upper end, said side wall members defining a central feed storage area therebetween,
each of said side wall members comprising spaced-apart upper and lower wall portions having outer surfaces which dwell in substantially the same vertical plane, an arcuate intermediate wall portion extending downwardly and inwardly from the lower end of said upper wall portion to said bottom portion inwardly of said lower wall portion,
a plurality of horizontally spaced-apart bowl divider walls extending inwardly from said lower wall portions to said intermediate wall portions to define feed bowls having inner and outer ends, spaced-apart side walls and a bottom, each of said intermediate wall portions having an opening formed therein at the inner end of each of said feed bowls to provide communication between said feed storage area and the feed bowls, said lower unit being of monolithic concrete construction, a feed control means selectively vertically movably mounted within said feed storage area adjacent said openings for controlling the rate of flow of the feed from the feed storage area to said feed bowls, and an agitator assembly mounted on said feed control means for vertical movement therewith, said agitator assembly including a movable bar means which extends outwardly through each of said openings in said intermediate wall portions into the associated feed bowl whereby movement of the bar means by a feeding hog will agitate the feed.

2. The feeder of claim 1 wherein each of said bar means is operatively connected to an agitator rod positioned within said feed storage area whereby movement of said bar means by a feeding hog will cause said rod to agitate the feed within said feed storage area.

3. A hog feeder comprising, at least a lower unit including a bottom portion, opposite end walls, spaced-apart side wall members extending between said end walls, and an open upper end, said side wall members defining a central feed storage area therebetween, each of said side wall members comprising spaced-apart upper and lower wall portions having outer surfaces which dwell in substantially the same vertical plane, an arcuate intermediate wall portion extending downwardly and inwardly from the lower end of said upper wall portion to said bottom portion inwardly of said lower wall portion, a plurality of horizontally spaced-apart bowl divider walls extending inwardly from said lower wall portions to said intermediate wall portions to define feed bowls having inner and outer ends, spaced-apart side walls and a bottom, each of said intermediate wall portions having an opening formed therein at the inner end of each of said feed bowls to provide communication between said feed storage area and the feed bowls, said lower unit being of monolithic concrete construction, an upper unit mounted on said lower unit to increase the feed storage area of the feeder, said upper unit including opposite end walls and opposite side walls, and a feed flow control means supported by said upper unit and positioned within said feed storage area for controlling the flow of feed from said feed storage area to said feed bowls, said feed flow control means comprising first and second supports secured to and extending between said side walls of said upper unit, an adjuster assembly mounted on each of said first and second supports, each of said adjuster assemblies comprising a vertically disposed first pipe secured to the associated support, a collar threadably mounted on the upper end of said first pipe, a crank handle secured to said first shaft portion above said collar, a first shaft portion rotatably extending downwardly through said collar, a second shaft portion extending downwardly from said first shaft portion, said second shaft portion having a diameter greater than the diameter of said first shaft portion, a bolt extending downwardly from said second shaft portion, a nut threadably mounted on said bolt, a second pipe having an upper end secured to said nut and extending downwardly therefrom, a frame means secured to the lower end of said second pipe including a pair of spaced-apart side wall members positioned inwardly of the openings in said intermediate wall portions whereby rotation of said bolt by said crank handle will cause said side wall members to move vertically with respect to said openings.

4. The feeder of claim 3 wherein a washer is mounted on said first shaft portion above said collar, said first shaft portion having an enlarged head portion positioned above said washer.

5. A hog feeder comprising, at least a lower unit including a bottom portion, opposite end walls, spaced-apart side wall members extending between said end walls, and an open upper end, said side wall members defining a central feed storage area therebetween, each of said side wall members comprising spaced-apart upper and lower wall portions having outer surfaces which dwell in substantially the same vertical plane, an arcuate intermediate wall portion extending downwardly and inwardly from the lower end of said upper wall portion to said bottom portion inwardly of said lower wall portion, a plurality of horizontally spaced-apart bowl divider walls extending inwardly from said lower wall portions to said intermediate wall portions to define feed bowls having inner and outer ends, spaced-apart side walls and a bottom, each of said intermediate wall portions having an opening formed therein at the inner end of each of said feed bowls to provide communication between said feed storage area and the feed bowls, and an agitator assembly removably mounted within said feed storage area, said agitator assembly comprising a plurality of vertically disposed and horizontally spaced-apart rods which are pivotally movable about vertical axes in said feed storage area, each of said rods having an angularly extending portion at its upper end, a bar operatively pivotally secured, about a horizontal axis, to each of said rods, said bars extending outwardly through said openings into said feed bowls whereby movement of said bar by a feeding hog will prevent feed from clogging in said openings and whereby lateral movement of said bar by a feeding hog will agitate the feed in said feed storage area.

6. A hog feeder comprising, at least a lower unit including a bottom portion, opposite end walls, spaced-apart side wall members extending between said end walls, and an open upper end, said side wall members defining a central feed storage area therebetween, each of said side wall members comprising spaced-apart upper and lower wall portions having outer surfaces which dwell in substantially the same vertical plane, an arcuate intermediate wall portion extending downwardly and inwardly from the lower end of said upper wall portion to said bottom portion inwardly of said lower wall portion, a plurality of horizontally spaced-apart bowl divider walls extending inwardly from said lower wall portions to said intermediate wall portions to define feed bowls having inner and outer ends, spaced-apart side walls and a bottom, each of said intermediate wall portions having an opening formed therein at the inner end of each of said feed bowls to provide communication between said feed storage area and the feed bowls, said lower unit being of monolithic concrete construction, an agitator assembly movably mounted within said feed storage area, said agitator assembly comprising a plurality of vertically disposed and horizontally spaced apart rods which are pivotally movable about vertical axes in said feed storage area, each of said rods having an angularly extending portion at its upper end, a bar operatively pivotally secured about a horizontal axis, to each of said rods, said bars extending outwardly through said openings into said feed bowls whereby movement of said bar by a feeding hog will prevent feed from clogging in said openings and whereby lateral movement of said bar by a feeding hog will agitate the feed in said feed storage area.

7. A hog feed comprising, at least a lower unit including a bottom portion, opposite end walls, spaced-apart side wall members extending between said end walls, and an open upper end, said side wall members defining a central feed storage area therebetween, each of said side wall members comprising spaced-apart upper and lower wall portions having outer surfaces which dwell in substantially the same vertical plane, an arcuate intermediate wall portion extending downwardly and inwardly from the lower end of said upper wall portion to said bottom portion inwardly of said lower wall portion, a plurality of horizontally spaced-apart bowl divider walls extending inwardly from said lower wall portions to said intermediate wall portions to define feed bowls having inner and outer ends, spaced-apart side walls and a bottom, each of said intermediate wall portions having an opening formed therein at the inner end of each of said feed bowls to provide communication between said feed storage area and the feed bowls, and an agitator assembly movably mounted within said feed storage area, said agitator assembly comprising a plurality of vertically disposed and horizontally spaced-apart rods which are pivotally movable about vertical axes in said feed storage area, each of said rods having an angularly extending portion at its upper end, a bar operatively pivotally secured, about its horizontal axis, to each of said rods, said bars extending outwardly through said openings into said feed bowls whereby movement of said bar by a feeding hog will prevent feed from clogging in said openings and whereby lateral movement of said bar by a feeding hog will agitate the feed in said feed storage area, a feed control means selectively vertically movably mounted within said feed storage area adjacent said openings for controlling the rate of flow of the feed from the feed storage area to said feed bowls, said agitator assembly being mounted on said feed control means.

8. A hog feeder comprising, a trough portion having a bottom and upstanding ends and upstanding sides which define a pair of spaced-apart trough members at the sides thereof, spaced-apart opposite end walls extending upwardly from the ends of sid trough portion, spaced-apart upstanding side walls extending between said end walls, said end walls and said side walls defining a central feed storage area therebetween which is in communication with said trough members, the lower ends of said side walls terminating above said trough members inwardly of the outer ends thereof, a feed agitator assembly movably mounted within said feed storage area, said agitator assembly comprising a plurality of upstanding and horizontally spaced-apart rods which are pivotally movable about vertical axes in said feed storage area, each of said rods having an angularly extending portion, a bar secured to each of said rods, said bars extending outwardly from said feed storage area into said trough members whereby movement of said bar by a feeding hog will prevent feed from clogging in the area between said feed storage area and said trough members and whereby lateral movement of said bar by a feeding hog will agitate the feed in said feed storage area, said bars also being operatively pivotally secured about a horizontal axis to each of said rods.

9. The hog feeder of claim 8 wherein said trough portion, end walls and side walls are comprised of a single monolithic concrete member.

10. The hog feeder of claim 29 wherein a feed control means is selectively vertically movably mounted within said feed storage area for controlling the rate of flow of feed from the feed storage area to said trough members, said agitator assembly being mounted on said feed control means.

* * * * *